(12) United States Patent
Gupta et al.

(10) Patent No.: US 7,333,448 B2
(45) Date of Patent: Feb. 19, 2008

(54) FULL DUPLEX TRANSCEIVER

(75) Inventors: Sandeep Kumar Gupta, Santa Clara, CA (US); Sanjay Kasturia, Palo Alto, CA (US); Jose Tellado, Sunnyvale, CA (US)

(73) Assignee: Teranetics, Inc., Santa Clara, CA (US)

( * ) Notice: Subject to any disclaimer, the term of this patent is extended or adjusted under 35 U.S.C. 154(b) by 838 days.

(21) Appl. No.: 10/699,761

(22) Filed: Nov. 3, 2003

(65) Prior Publication Data

US 2005/0094583 A1    May 5, 2005

(51) Int. Cl.
*H04B 3/20* (2006.01)
(52) U.S. Cl. ................... 370/286; 379/406.01
(58) Field of Classification Search ........... None
See application file for complete search history.

(56) References Cited

U.S. PATENT DOCUMENTS 4,811,342 A * 3/1989 Huang ................ 370/292
6,373,908 B2   4/2002 Chan
6,518,800 B2 * 2/2003 Martin et al. ............. 327/94
2001/0035994 A1 * 11/2001 Agazzi et al ............ 359/152

* cited by examiner

Primary Examiner—Ramnandan Singh
(74) Attorney, Agent, or Firm—Brian R. Short

(57) ABSTRACT

The invention includes a full duplex transceiver for transmitting and receiving communication signals. The transceiver includes 1 to N sample and hold circuits. Each sample and hold circuit receives a first signal that includes a far-end signal, and in some cases an echo signal, and in some cases alternatively or additionally cross-talk signals. The transceiver additionally includes a plurality of subtraction circuits. Each subtraction circuit receives an output of at least one of the sample and hold circuits. Each subtraction circuit subtracts at least a fraction of a replica signal from at least a fraction of the output of the at least one of the sample and hold circuits. The subtraction circuits generate an output that represent the far-end signal with substantially reduced echo and/or cross-talk interference, and is available for additional receiver processing.

29 Claims, 9 Drawing Sheets

SAMPLING AND HOLDING N VERSIONS OF A FIRST SIGNAL, THE FIRST SIGNAL INCLUDING A FAR-END SIGNAL, AN ECHO SIGNAL, AND/OR CROSS-TALK SIGNALS

910

GENERATING N REPLICA SIGNALS OF A TRANSMIT SIGNAL AND/OR CROSS-TALK SIGNALS

920

SUBTRACTING AT LEAST A FRACTION OF EACH OF THE N REPLICA SIGNALS FROM AT LEAST A FRACTION OF THE N SAMPLE AND HOLD VERSIONS OF THE FIRST SIGNAL GENERATING N VERSIONS OF THE FAR END SIGNAL

930

FIGURE 9

# FULL DUPLEX TRANSCEIVER

FIELD OF THE INVENTION

The invention relates generally to network communications. More particularly, the invention relates to a high-speed full duplex transceiver.

BACKGROUND OF THE INVENTION

High-speed networks are continually evolving. The evolution includes a continuing advancement in the operational speed of the networks. The network implementation of choice that has emerged is Ethernet networks physically connected over twisted pair wiring. One of the most prevalent high speed LANs (local area network) for providing connectivity between personal computers, workstations and servers is Ethernet in its 10BASE-T form.

High-speed LAN technologies include 100BASE-T (Fast Ethernet) and 1000BASE-T (Gigabit Ethernet). Fast Ethernet technology has provided a smooth evolution from the 10 megabits per second (Mbps) performance of 10BASE-T to the 100 Mbps performance of 100BASE-T. Gigabit Ethernet provides 1 Gigabit per second (Gbps) data rate with essentially the simplicity of Ethernet. There is a desire to push operating performance to even greater data rates.

Ethernet is the high speed LAN technology of choice. FIG. 1 shows a block diagram of an Ethernet transceiver pair communicating over a bi-directional transmission channel 135, according to the prior art. The transceiver pair includes a first transceiver 100 and a second transceiver 105. The first transceiver 100 includes a transmitter section 110 that receives digital data for transmission over a transmission channel 135. The first transceiver 100 also includes a receiver section 120 that receives analog data.

A hybrid circuit 130 is an electrical bridge circuit that is designed to provide some isolation between a receiver and a transmitter. Without a hybrid circuit 130, the transmitter section 110 and the receiver section 120 are directly connected to a twisted pair of the transmission channel 135. The direct connection between the transmitter and the receiver typically causes at least a portion of transmitter signals to be received by the receiver. The transmitter signal received by the receiver can be referred to as an "echo" signal. The hybrid circuit 130 is designed to mitigate the effects of the echo signal.

The hybrid circuit 140 of the second transceiver 105 operates in the same manner as the hybrid circuit 130 of the first transceiver 100. The transmitter section 150 and the receiver section 160 of the second transceiver 105 operate in the same manner as the transmitter section 110 and receiver section 120 of the first transceiver 100.

An implementation of high speed Ethernet networks includes simultaneous, full bandwidth transmission, in both directions (termed full duplex), within a selected frequency band. When configured to transmit in full duplex mode, Ethernet line cards are generally required to have transmitter and receiver sections of an Ethernet transceiver connected to a common twisted wiring pair.

FIG. 2 shows diagram of a hybrid receiver circuit of a full duplex communication receiver, according to the prior art. The hybrid receiver 200 includes a hybrid circuit 210 that receives a received signal (RX) and a replica signal (REPLICA). The replica signal represents a signal being transmitted (generally, a scaled and processed representation). Additionally, the replica signal can include processed versions of the cross-talk signals. The cross-talk signals generally include far-end cross-talk (FEXT) signals and near-end cross-talk (NEXT) signals. The FEXT and NEXT signals are generally interference signals from neighboring twisted pair connection within an Ethernet bundle. The received signal includes an echo signal, cross-talk signals and a desired receive signal (also referred to as a far end signal). The hybrid is designed to minimize the effects of the echo signal, and the cross-talk signals by subtracting at least a portion of the replica signal from the received signal. Additionally, the hybrid circuit can minimize cross-talk signals.

The analog to digital conversion functionality is generally implemented with sample and hold (S/H) circuit functionality as shown by block 220, and an analog to digital converter (ADC) 230 of FIG. 2. The block 220 can also include a programmable gain adjust. The S/H 220 reduces the bandwidth requirements of electronic circuitry located after the S/H 220. The S/H 220 provides constant sampled and held waveforms that are well behaved. The S/H 220 and the ADC 230 include clock frequencies that are high enough to provide enough resolution to receive the transmitted signals.

It is desirable to have a high data rate transceiver that provides separation of transmit signals from receive signals while operating in full duplex mode.

SUMMARY OF THE INVENTION

The invention includes an apparatus and method for a high data rate transceiver that provides for reduction of transmitter signals at a receiver of the transceiver, while operating in full duplex mode.

An embodiment of the invention includes a full duplex transceiver for transmitting and receiving communication signals. The transceiver includes 1 to N sample and hold circuits. Each sample and hold circuit receives a first signal that includes a far-end signal, in some cases an echo signal, and in some cases cross-talk signals. Each sample and hold circuit may additionally receive a replica signal. The transceiver additionally includes a plurality of subtraction circuits. Each subtraction circuit receives an output of at least one of the sample and hold circuits. Each subtraction circuit subtracts at least a fraction of a replica signal from at least a fraction of the output of the at least one of the sample and hold circuits.

Another embodiment of the invention includes a method of receiving a far end signal with a full duplex transceiver. The method includes sampling and holding N versions of a first signal. The first signal includes a far-end signal, in some cases an echo signal, and in some cases cross-talk signals. N replica signals of a transmit signal are generated. At least a fraction of each of N replica signals are subtracted from at least a fraction of the N sample and hold versions of the first signal generating N representations of the far end signal.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 9 shows a flow chart of acts included within a high-speed hybrid receiver circuit, according to an embodiment of the invention.

DETAILED DESCRIPTION

Figure 1:
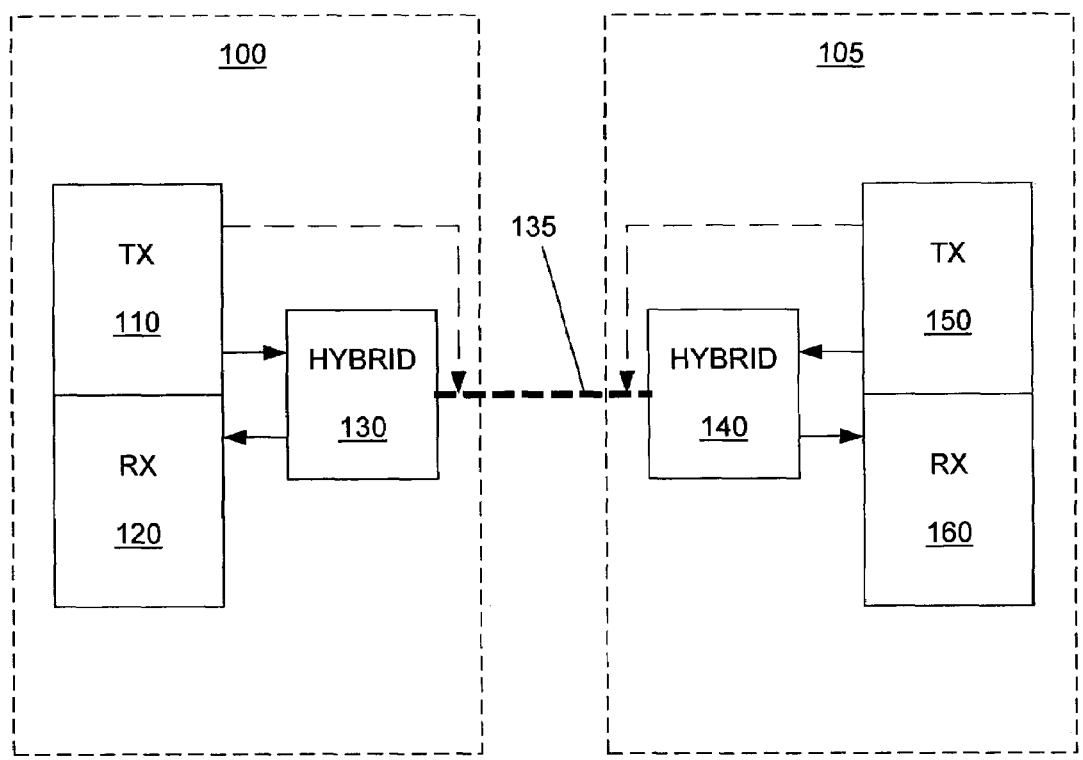
FIG. 1 shows a block diagram of a transceiver pair communicating over a bi-directional transmission channel, according to the prior art.

As shown in the drawings for purposes of illustration, the invention is embodied in an apparatus and method for a high data rate transceiver that provides for reduction of transmit signals at a receiver of the transceiver, while operating in full duplex mode.

Ethernet transceivers are being developed for greater data transmission rates. For example, 10 Gbps Ethernet provides data rates of ten times greater than the previously described 1 Gbps Ethernet. The problems caused by echo signals are even greater because high data rates require hybrid and associated circuits to operate at even greater frequencies. The greater frequency circuits are much harder to implement.

Figure 3:
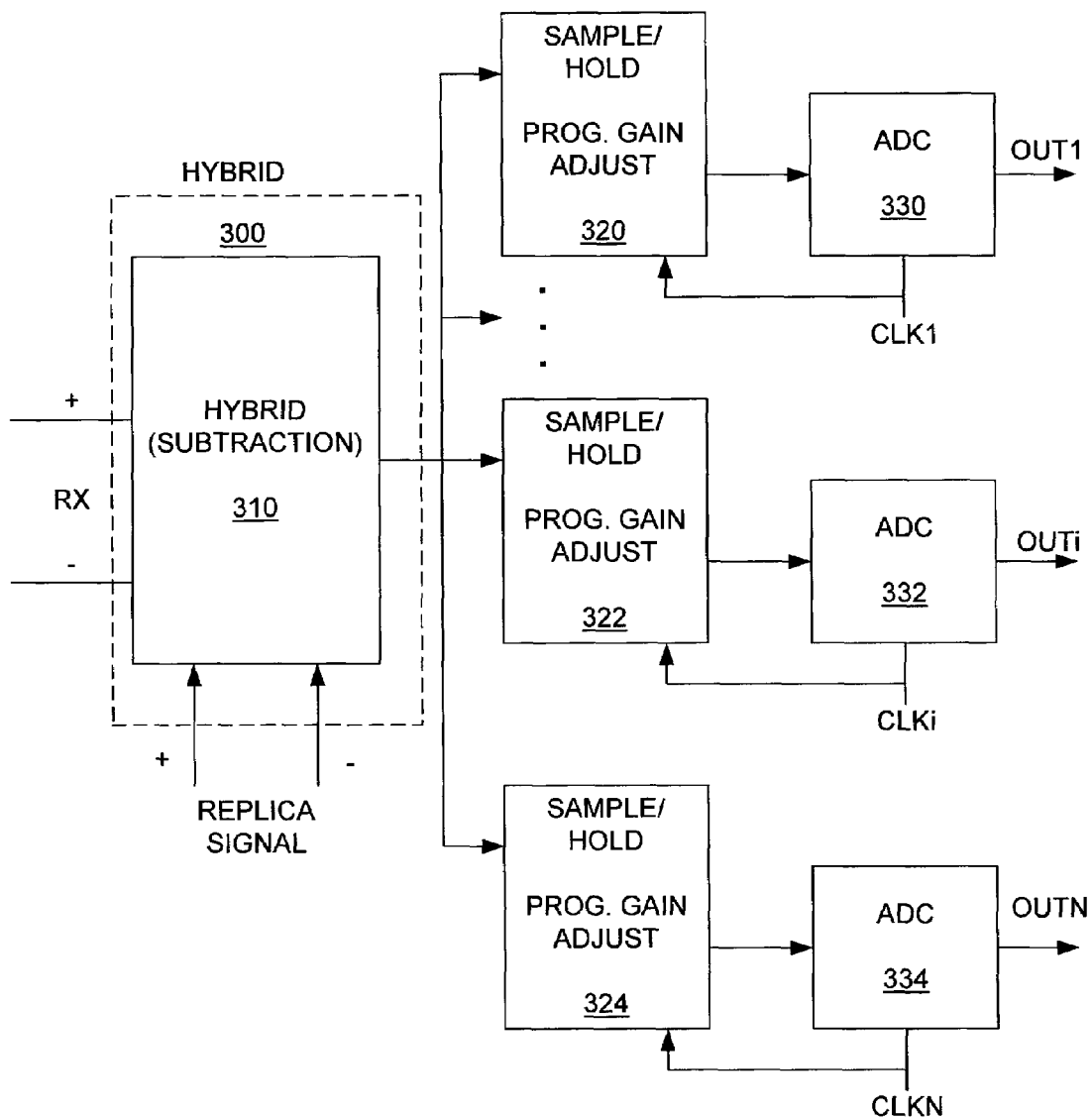
FIG. 3 shows a diagram of a possible high-speed hybrid receiver circuit of a full duplex communication receiver.

FIG. 3 shows a diagram of a possible high-speed hybrid receiver circuit of a full duplex communication receiver. The output of the hybrid circuit 310 is connected to N separate sample and hold (S/H) circuit 320, 322, 324. The N S/H circuits 320, 322, 324 can be configured to include a programmable gain adjust.

Each of the N S/H circuit 320, 322, 324 receives a separate clock signal. The clock signals of each of the N S/H circuits 320, 322, 324 is delayed so that the combined output of the N S/H circuits 320, 322, 324 is effectively the clock frequency of the N S/H circuits 320, 322, 324 multiplied by N. More precisely, the phase of clock signals vary from zero degrees to 360 degrees in increments of 360/N degrees. For example, if N=8, then the phase of the clock signal to the first S/H circuit 320 is (360/8) degrees, the phase of the clock signal to the ith S/H circuit 322 is (i) multiplied by (360/8) degrees, and the phase of the Nth S/H circuit 324 is 360 degrees.

Corresponding ADC circuits 330, 332, 334 receive outputs of the N S/H circuits 320, 322, 324. It should be noted that this configuration also reduces the frequency of signals received by the ADC circuits 330, 332, 334.

The clocks of the N S/H circuits 320, 322, 324 and the ADC circuits 330, 332, 334 do not have to be identical as shown in FIG. 3. Generally, the clocks are all of a common frequency, but the clocks can have different phases. A delay may exist between the clock signal of an ADC circuit and the corresponding S/N circuit.

Figure 2:
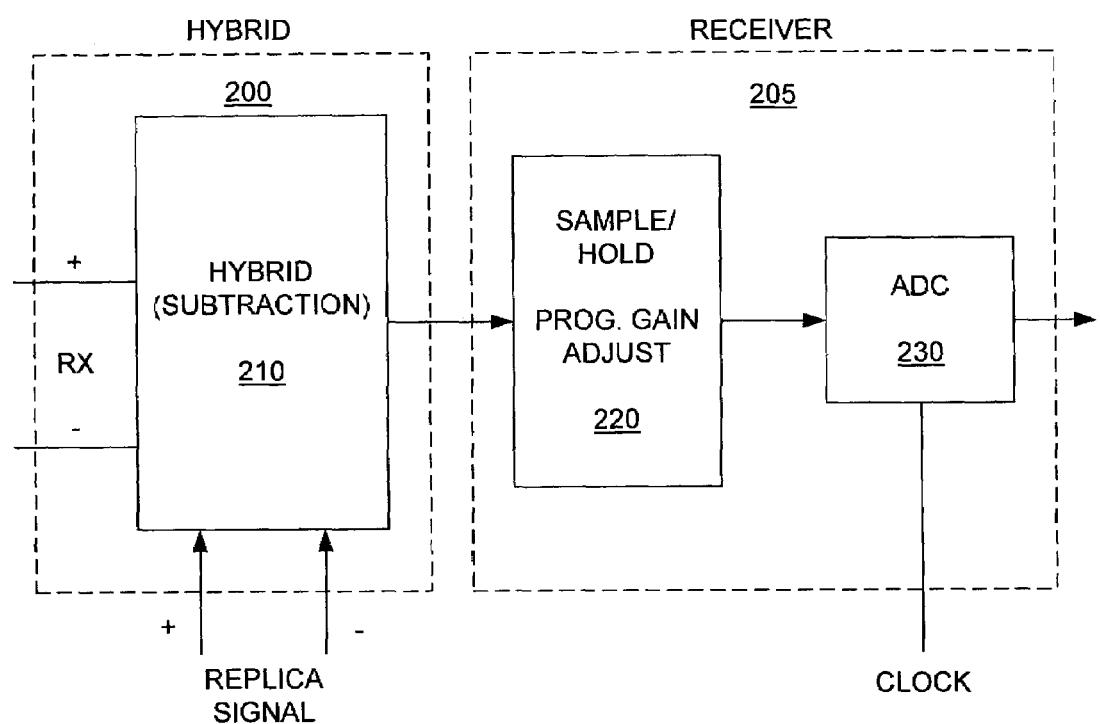
FIG. 2 shows diagram of a hybrid receiver circuit of a full duplex communication receiver, according to the prior art.

The configuration of FIG. 3 reduces the frequency of the clock received by the N S/H circuits as compared to the configuration of FIG. 2. Therefore, the N S/H circuits of FIG. 3 are easier to implement. However, the hybrid circuit 310 must operate at a high enough signal frequency to properly resolve the received and transmitted signals. The hybrid circuit 310 shown in FIG. 3 receives analog signals.

The analog signal subtraction circuitry of the hybrid circuit 310 generally includes operational amplifier equivalent circuits. The operational amplifier circuits must be able to operate at frequencies greater than the received and transmitted signals. For example, for 10 Gbps signals transmitted over four neighboring twisted pair cables, the received signals include signal frequency components of as high as 500 MHz. The operational amplifier circuit must provide substantial gain at frequencies of up to 500 MHz. Therefore, the unity gain frequencies of the operational amplifier must be substantially greater than 500 MHz. The configuration of FIG. 3 can be difficult to implement for 10 Gbps Ethernet due to the high operational frequency required of the subtraction circuitry.

Figure 4:
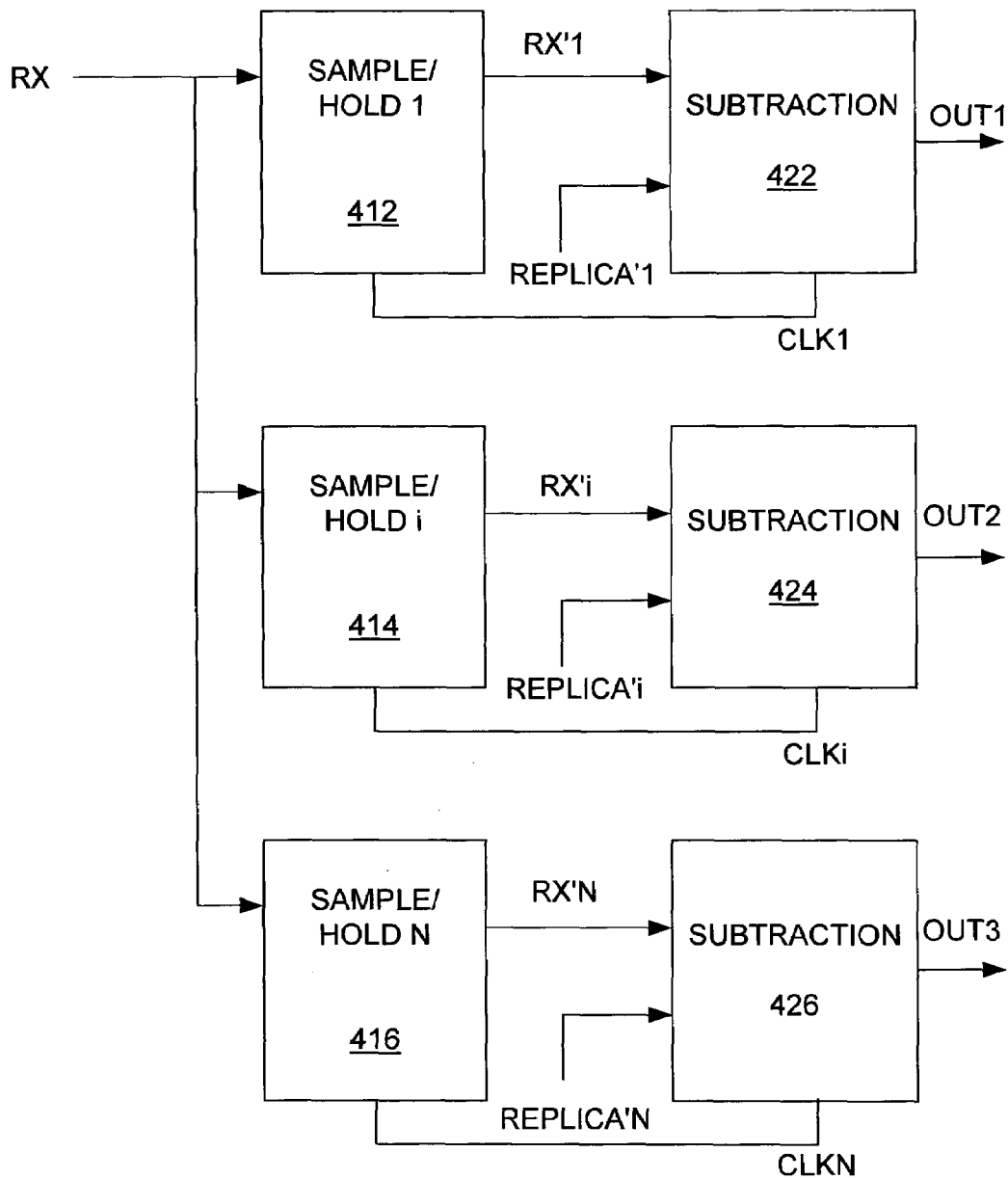
FIG. 4 shows a diagram of a high-speed hybrid receiver circuit of a full duplex communication receiver, according to an embodiment of the invention.

FIG. 4 shows a diagram of a high-speed hybrid receiver circuit of a full duplex communication receiver, according to an embodiment of the invention. The embodiment provides for a reduced signal frequency of the hybrid circuits.

The embodiment of FIG. 4 includes N S/H circuits 412, 414, 416 that receive the received signal (Rx). Generally N is an integer, greater than or equal to one. Each of the N S/H circuits 412, 414, 416 is connected to a corresponding subtraction circuit 422, 424, 426. The subtraction circuits 422, 424, 426 perform an equivalent operation as the previously described hybrid circuits.

The subtraction circuits 422, 424, 426 receive the sampled receive signal (Rx') and replica signal (REPLICA'), and subtracts the replica signal from the received signal to provide an estimate of the far end signal received by the transceiver. Due to the much lower frequency of signals received by the subtraction circuits 422, 424, 426 of FIG. 4 compared to the hybrid circuit 310 of FIG. 3, the subtraction circuits 422, 424, 426 are much easier to implement.

The replica signal can include a representation of the transmit signal only, a representation of cross-talk signals, or a representation of the transmit signal and signal cross-talks. The replica signal only includes a representation of the transmit signal when only an echo signal is to be subtracted from the received signal. The replica signal can alternatively or additionally include a representation of cross-talk signals to be subtracted from the received signal.

Each of the N S/H circuits 412, 414, 416, and corresponding subtraction circuit 422, 424, 426 receive a separate clock signal. The clock signals of each of the S/H circuits 412, 414, 416 are delayed so that the combined output of the S/H circuits 412, 414, 416 is effectively the clock frequency of the S/H circuits 412, 414, 416 multiplied by N. The phase of the clock signals vary from zero degrees to 360 degrees in increments of 360/N degrees. For example, if N=8, then the phase of the clock signal to the first S/H circuit 412 is (360/8) degrees, the phase of the clock signal to the ith S/H circuit 414 is (i) multiplied by (360/8) degrees, and the phase of the clock signal to the Nth S/H circuit 416 is 360 degrees. The phase of the clock signal (CLK1) to the first subtraction circuit 422 is (360/8) degrees, the phase of the clock signal (CLKi) to the ith subtraction circuit 424 is (i) multiplied by (360/8) degrees, and the phase of the clock signal (CLKN) of the Nth subtraction circuit 426 is 360 degrees.

The multiple clock configuration of FIG. 4 allows the subtraction circuits 422, 424, 426 to receive a signal frequency that is much lower than the signal frequency of the received signal Rx. Therefore, the subtraction circuits 422, 424, 426 are much easier to implement than the hybrid circuit 310 of FIG. 3.

The subtraction circuits 422, 424, 426 include clock signals. However, other embodiments of the subtraction circuits are not required to include clock signals. The subtraction circuits generate outputs (OUT1, OUT2, OUT3).

Figure 5:
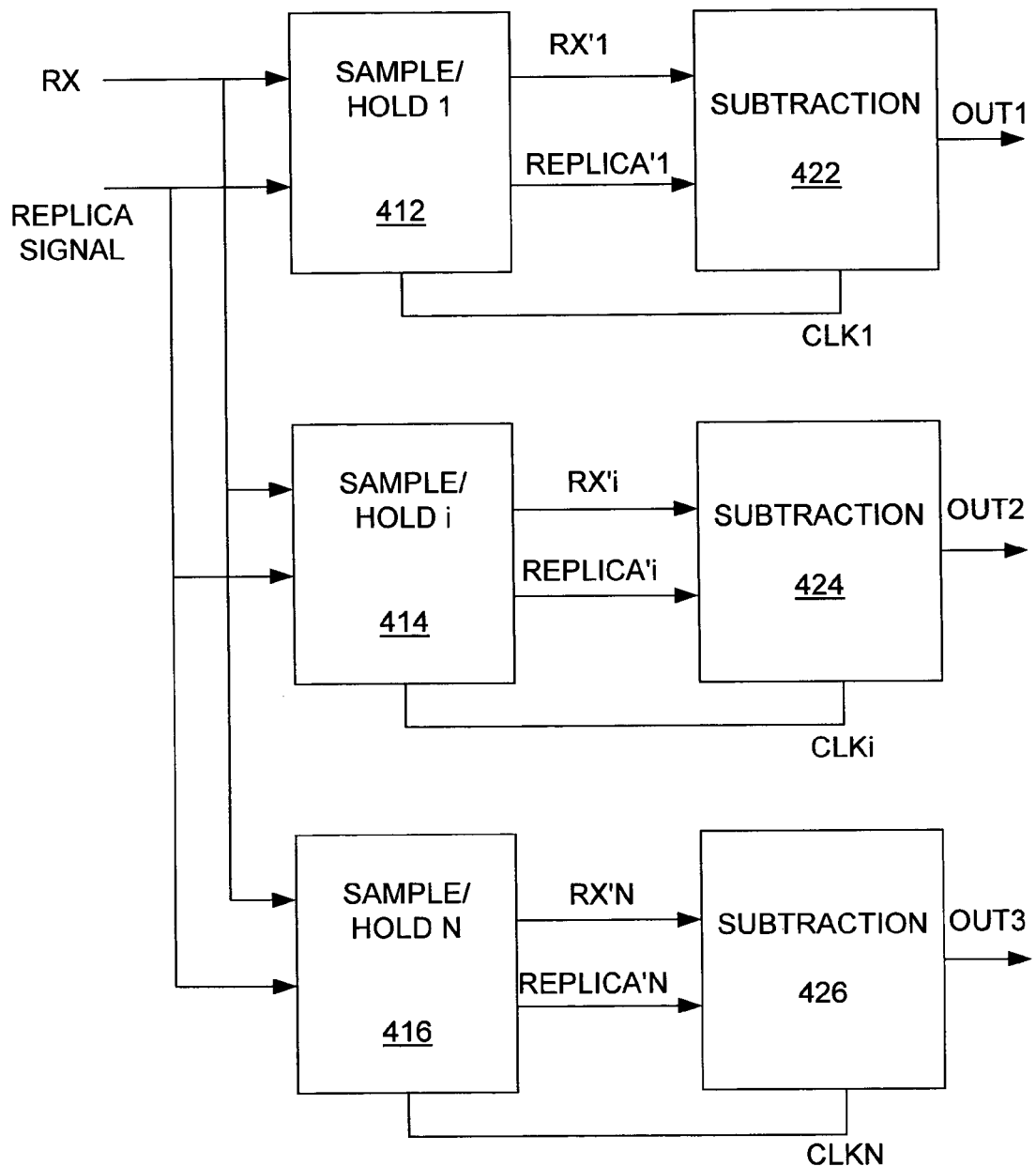
FIG. 5 shows a diagram of a high-speed hybrid receiver circuit of a full duplex communication receiver, according to another embodiment of the invention.

FIG. 5 shows a diagram of a high-speed hybrid receiver circuit of a full duplex communication receiver, according to an embodiment of the invention. The embodiment provides for the hybrid circuits (subtraction) receiving signals having a reduced signal frequency.

The embodiment of FIG. 5 includes N S/H circuits 412, 414, 416 that receive both the received signal (Rx) and the replica (REPLICA) signal. Each of the N S/H circuits 412, 414, 416 is connected to a corresponding subtraction circuit 422, 424, 426. The subtraction circuits 422, 424, 426 perform an equivalent operation as the previously described hybrid circuits.

The subtraction circuits 422, 424, 426 receive the sampled receive signals (Rx') and replica signals (REPLICA') and subtracts the replica signals from the sampled received signals to provide an estimate of the far end signal received by the transceiver.

A combination of both FIG. 4 and FIG. 5 may be configured that includes both the replica signal being received by the S/H circuits 412, 414, 416, and a lower frequency replica signal being directly received by the subtraction circuits 422, 424, 426.

Figure 6:
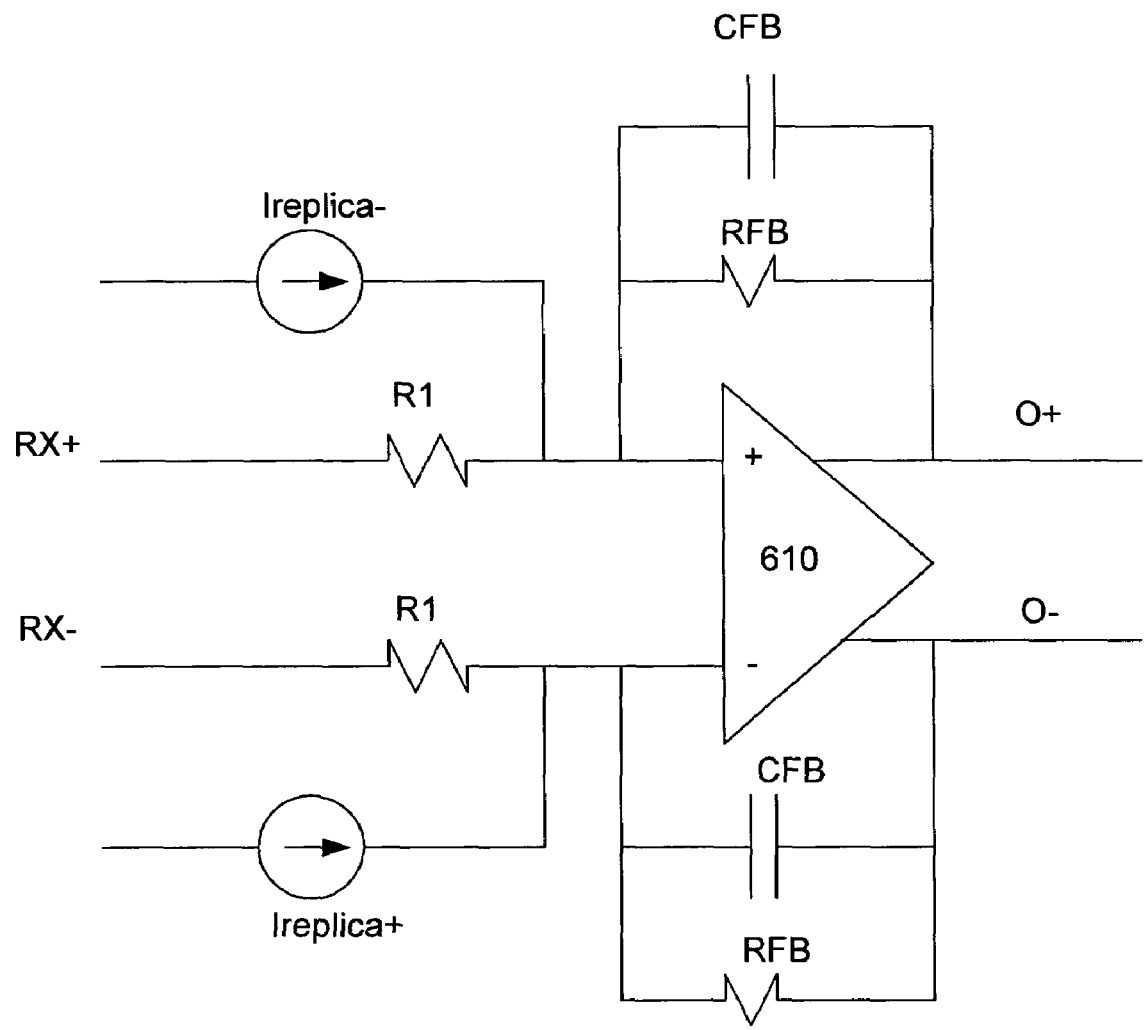
FIG. 6 shows a subtraction circuit that provides subtraction of a replica signal from a received signal.

FIG. 6 shows a subtraction circuit that provides subtraction of a replica signal (Ireplica+, Ireplica−) from a received signal (RX+, RX−). The gain element 610 of the subtraction circuit can be implemented with an operational amplifier. The gain of the subtraction circuit of FIG. 5, is determined by the values of input resistors R1, and feedback components RFB, CFB. The operational amplifier 510 generates a differential output O+, O− that represents the difference between the replica signal and the received signal.

Figure 7:
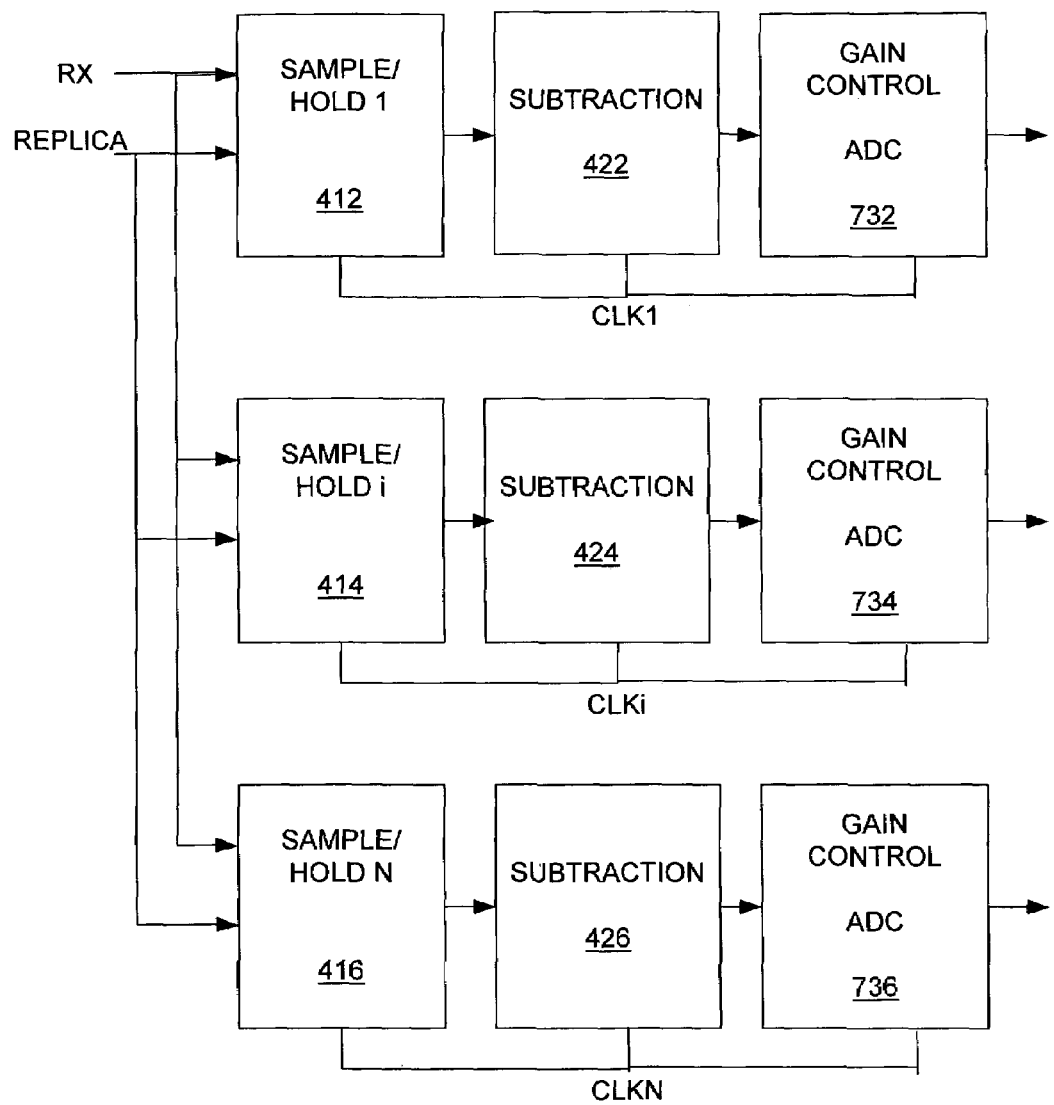
FIG. 7 shows a diagram of a high-speed hybrid receiver circuit of a full duplex communication receiver, according to another embodiment of the invention.

FIG. 7 shows a diagram of a high-speed hybrid receiver circuit of a full duplex communication receiver, according to another embodiment of the invention. The embodiment includes gain control and analog to digital conversion (ADC) 732, 734, 736 after each of the subtraction circuits 422, 424, 426. A gain control block 732, 734, 736 corresponds with each of the subtraction circuits 422, 424, 426. This embodiment includes N gain control blocks 732, 734, 736.

The gain control blocks 732, 734, 736 provide equalization of attenuation within an Ethernet transmission channel. More specifically, the attenuation of the channel (twisted pair cables) can vary depending upon the length of the cables. The programmable gain blocks 732, 734, 736 vary the gain of the transmission channels depending upon the attenuation of the transmission channels caused by the variable channel (cable) lengths. The ability to increase the gain of a channel that is subjected to attenuation minimizes the variation of signal amplitude at inputs of the ADC(s). This enable full-scale range of the ADC to be used for a larger range of channel lengths leading to a lower dynamic range requirement on the ADC(s). This greatly improves the ability of the ADC(s) to digitize received signals.

The embodiment shown in FIG. 7 is merely an example. Other embodiments can include the subtraction, gain control and ADC functionality being located in different orders. As previously described, clock circuitry of the functional blocks (subtraction, gain control, ADC) include clocks that are delayed. More specifically, the phase of clock signals vary from zero degrees to 360 degrees in increments of 360/N degrees. For example, if N=8, then the phase of the clock signal to the first functional block (subtraction, gain control, ADC) is (360/8) degrees, the phase of the clock signal to the ith functional block (subtraction, gain control, ADC) is (i) multiplied by (360/8) degrees, and the phase of the Nth functional block (subtraction, gain control, ADC) is 360 degrees.

Figure 8:
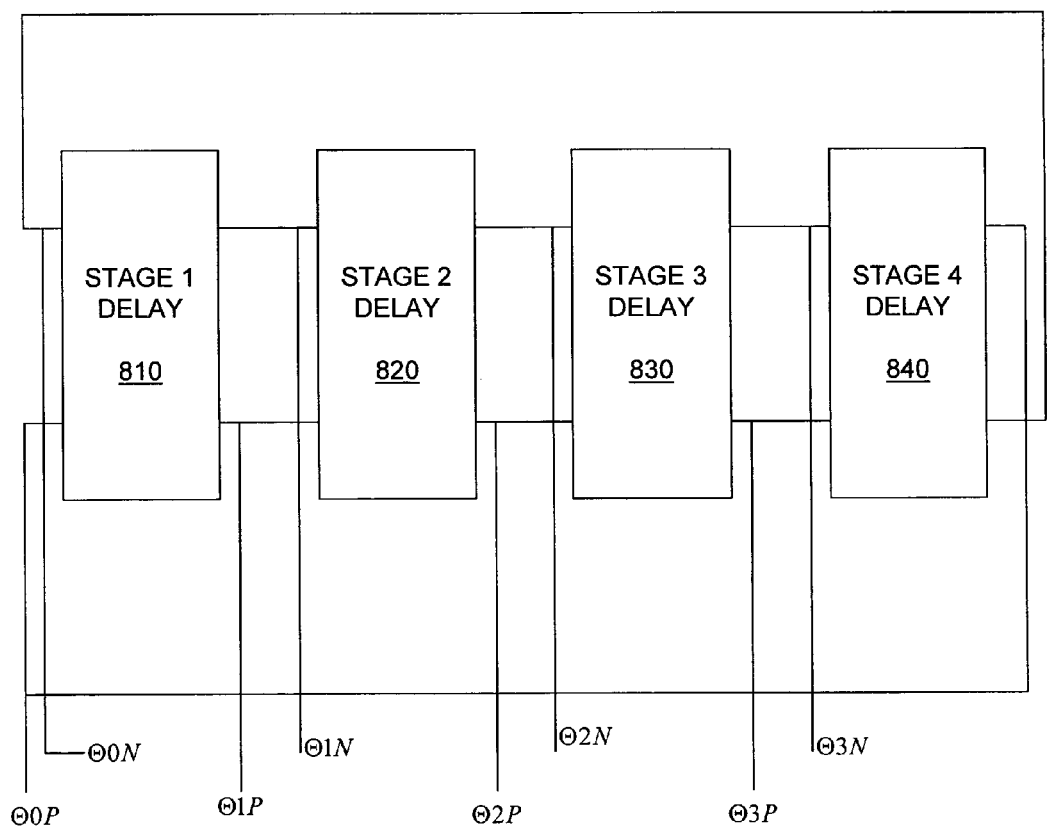
FIG. 8 shows a diagram of a multiple clock signal generator that can be utilized by embodiments of the invention.

FIG. 8 shows a diagram of a multiple clock signal generator that can be utilized by an embodiment of the invention. Generally, the clock signal generator of FIG. 8 is termed a "ring oscillator."

The ring oscillator 800 of FIG. 8 includes four delay gates 810, 820, 830, 840. Outputs of each of the delay gates 810, 820, 830, 840 provides a clock signal having varying degrees of delay depending upon the number of delay gates included within the ring oscillator 800. The eight output taps Θ0P, Θ0N, Θ1P, Θ2N, Θ2P, Θ2N, Θ3P, Θ3N of the delay gates provide clock signals of eight evenly spaced phases.

The multiple clock signal generator (ring oscillator) of FIG. 8 is provided as an example of a multiple clock signal generator according to the invention. Other implementations of the multiple clock signal generator can be utilized. The multiple clock signal generator is required to provide clock signals of a desired frequency, at a multiple of phases.

FIG. 9 shows a flow chart of acts included within a high-speed hybrid receiver circuit, according to an embodiment of the invention.

A first act 910 includes sampling and holding N versions of a first signal, the first signal comprising a far-end signal, and in some case an echo signal, and in some cases additionally cross-talk signals.

A second act 920 includes generating a N replica signals of a transmit signal, and/or cross-talk signals.

A third act 930 includes subtracting at least a fraction of each of the N replica signals from at least a fraction of the N sample and hold versions of the first signal generating N versions of the far end signal.

The full duplex transceiver is generally included within a network line card. The network line card can be included within a server or a LAN system.

Although specific embodiments of the invention have been described and illustrated, the invention is not to be limited to the specific forms or arrangements of parts so described and illustrated. The invention is limited only by the appended claims.

What is claimed:

1. A full duplex transceiver for transmitting and receiving communication signals, the transceiver comprising:
    1 to N sample and hold circuits, each sample and hold circuit receiving a first signal comprising a far-end signal, and receiving a replica signal including an echo signal and a cross-talk signal, wherein each of the N sample and hold circuits receives one of N clock signals, and wherein a phase of each of the N clock signals relative to the other (N−1) clock signals is dependent on the value of N; and
    a plurality of subtraction circuits, each subtraction circuit receiving an output of at least one of the sample and hold circuits, each subtraction circuit subtracting at least a fraction of a sampled and hold replica signal from at least a fraction of the output of the at least one of the sample and hold circuits.

2. The full duplex transceiver of claim 1, wherein each sample and hold circuit additionally generates a corresponding sampled and hold replica signal.

3. The full duplex transceiver of claim 1, wherein the sampled and hold replica signal has a replica signal frequency that is lower than a signal frequency of the first signal.

4. The full duplex transceiver of claim 1, wherein the output of the at least one sample and hold circuits is subjected to analog processing before being received by the subtraction circuit.

5. The full duplex transceiver of claim 1, wherein the sampled and hold replica signal is subjected to analog processing before being received by the subtraction circuit.

6. The full duplex transceiver of claim 1, wherein the first signal comprises the far-end signal, and cross-talk signals.

7. The full duplex transceiver of claim 1, wherein the ith sample and hold circuit receives an ith clock signal.

8. The full duplex transceiver of claim 1, wherein each subtraction circuit generates an analog output, a combination of the analog outputs of the subtraction circuits generating a representation of the far end signal.

9. The full duplex transceiver of claim 1, wherein the ith subtraction circuit receives the ith clock signal.

10. The full duplex transceiver of claim 1, wherein the subtraction circuits are continuous time circuits.

11. The full duplex transceiver of claim 1, wherein output signals of the subtraction circuits are received by analog to digital converters (ADC)s, the ADCs generating a digital output representing the far end signal.

12. The full duplex transceiver of claim 1, wherein an ith ADC receives the ith clock signal.

13. The full duplex transceiver of claim 1, further comprising a clock generation circuitry, the clock generation circuitry generating N clock signals, wherein a phase of the clock signals are spaced apart from each other by approximately (360/N) degrees.

14. The full duplex transceiver of claim 1, wherein the first signal further includes cross-talk signals.

15. A method of receiving a first signal with a full duplex transceiver, the first signal comprising a far end signal, an echo signal and a cross-talk signal, the method comprising:
   sampling and holding N versions of the first signal with N clock signals, and wherein a phase of each of the N clock signals relative to the other (N−1) clock signals is dependent on the value of N;
   sampling and holding N versions of a replica signals with the N clock signals;
   subtracting at least a fraction of each of the N sample and hold versions of the replica signals from at least a fraction of the N sample and hold versions of the first signal generating N versions of the far end signal.

16. The method of receiving a far end signal of claim 15, wherein the first signal comprises the far-end signal and an echo signal.

17. The method of receiving a far end signal of claim 15, wherein the first signal comprises the far-end signal and cross-talk signals.

18. The method of receiving a far end signal of claim 15, wherein the first signal comprises the far-end signal, an echo signal and cross-talk signals.

19. The method of receiving a far end signal of claim 15, wherein the sampling and holding is driven by a clock frequency of Fs/N, where Fs is a frequency greater than twice the frequency of the highest frequency component of the far end signal.

20. The method of receiving a far end signal of claim 15, further comprising:
   programmably controlling an amplitude of the far end signals.

21. The method of receiving a far end signal of claim 15, further comprising:
   generating digital samples of analog versions of the far end signal.

22. The method of receiving a far end signal of claim 15, wherein the ith sample and hold circuit receives an ith clock signal.

23. The method of receiving a far end signal of claim 15, wherein each subtraction circuit generates an analog output, a combination of the analog outputs of the subtraction circuits generating a representation of the far end signal.

24. The method of receiving a far end signal of claim 15, wherein the ith subtraction circuit receives an ith clock signal.

25. The method of receiving a far end signal of claim 15, wherein the subtraction circuits are continuous time circuits.

26. The method of receiving a far end signal of claim 15, wherein output signals of the subtraction circuits are received by analog to digital converters (ADC)s, the ADCs generating a digital output representing the far end signal.

27. The method of receiving a far end signal of claim 15, wherein an ith ADC receives an ith clock signal.

28. The method of receiving a far end signal of claim 15, further comprising generating N clock signals, wherein a phase of the clock signals are spaced apart from each other by approximately (360/N) degrees.

29. A network line card, the network line card comprising a full duplex transceiver, the full duplex transceiver comprising:
   1 to N sample and hold circuits, each sample and hold circuit receiving a first signal comprising a far-end signal, and receiving a replica signal including an echo signal and a cross-talk signal, wherein each of the N sample and hold circuits receives one of N clock signals, and wherein a phase of each of the N clock signals relative to the other (N−1) clock signals is dependent on the value of N; and
   a plurality of subtraction circuits, each subtraction circuit receiving an output of at least one of the sample and hold circuits, each subtraction circuit subtracting at least a fraction of a sample and hold replica signal from at least a fraction of the output of the at least one of the sample and hold circuits.

* * * * *